United States Patent
Gatta et al.

(10) Patent No.: US 9,887,563 B2
(45) Date of Patent: Feb. 6, 2018

(54) PORTABLE CHARGING CASE HAVING A HINGED LID

(71) Applicant: Altria Client Services LLC, Richmond, VA (US)

(72) Inventors: Tony Gatta, Philadelphia, PA (US); David R. Schiff, Highland Park, NJ (US)

(73) Assignee: Altria Client Services LLC, Richmond, VA (US)

( * ) Notice: Subject to any disclaimer, the term of this patent is extended or adjusted under 35 U.S.C. 154(b) by 182 days.

(21) Appl. No.: 14/872,436

(22) Filed: Oct. 1, 2015

(65) Prior Publication Data
US 2016/0099592 A1    Apr. 7, 2016

Related U.S. Application Data

(60) Provisional application No. 62/058,399, filed on Oct. 1, 2014.

(51) Int. Cl.
*H01M 10/46* (2006.01)
*H02J 7/00* (2006.01)

(52) U.S. Cl.
CPC ............ *H02J 7/0042* (2013.01); *H02J 7/007* (2013.01); *H02J 7/0044* (2013.01); *H02J 7/0054* (2013.01); *H02J 2007/0062* (2013.01)

(58) Field of Classification Search
CPC ................................ H02J 7/355; H02J 7/0042
USPC ........ 320/107, 114, 115; 206/242, 256, 261, 206/265, 266
See application file for complete search history.

(56) References Cited

U.S. PATENT DOCUMENTS

| | | |
|---|---|---|
| 2,258,086 A | 10/1941 | Bolle |
| 2,558,607 A | 6/1951 | Dallenbach |
| 3,681,018 A | 8/1972 | Knauff |
| 4,193,411 A | 3/1980 | Faris et al. |
| 5,095,921 A | 3/1992 | Losee et al. |
| 5,179,966 A | 1/1993 | Losee et al. |
| 5,249,586 A | 10/1993 | Morgan et al. |
| 5,322,075 A | 6/1994 | Deevi et al. |
| 5,388,594 A | 2/1995 | Counts et al. |
| 5,591,368 A | 1/1997 | Fleischhauer et al. |
| 5,758,637 A | 6/1998 | Ivri et al. |
| 6,085,740 A | 7/2000 | Ivri et al. |

(Continued)

OTHER PUBLICATIONS

International Search Report for Application No. PCT/US2015/053234 dated Feb. 2, 2016.

(Continued)

*Primary Examiner* — Edward Tso
(74) *Attorney, Agent, or Firm* — Harness, Dickey & Pierce

(57) ABSTRACT

A portable charging case configured to contain and charge an electronic vaping device or a battery thereof is provided. The portable charging case includes a body, a cover hingedly connected to the body at a hinge axle, and a hinge assembly. The hinge assembly includes a biasing component including a pin having an integrally formed straight first end portion and a curved second end portion. The biasing component also includes a spring arranged about the straight first end portion of the pin. The pin extends through an opening in a housing, such that the spring presses against a bottom surface of the housing and against a base of the curved second end portion of the pin.

26 Claims, 2 Drawing Sheets

(56) References Cited

U.S. PATENT DOCUMENTS

| | | |
|---|---|---|
| 7,389,878 B1 | 6/2008 | Torrico |
| 8,314,591 B2 | 11/2012 | Terry et al. |
| 2009/0186264 A1 | 7/2009 | Huang |
| 2009/0283103 A1 | 11/2009 | Nielsen et al. |
| 2010/0307518 A1 | 12/2010 | Wang |
| 2011/0209717 A1 | 9/2011 | Han |
| 2012/0227752 A1 | 9/2012 | Alelov |
| 2013/0183852 A1 | 7/2013 | Rostami |
| 2014/0007892 A1 | 1/2014 | Liu |
| 2014/0020697 A1 | 1/2014 | Liu |
| 2014/0083443 A1 | 3/2014 | Liu |
| 2014/0216961 A1 | 8/2014 | Liu |
| 2014/0286002 A1 | 9/2014 | Liu |
| 2014/0299491 A1 | 10/2014 | Liu |
| 2014/0299492 A1 | 10/2014 | Liu |
| 2016/0120218 A1* | 5/2016 | Schennum .............. A24F 15/12 206/266 |

OTHER PUBLICATIONS

International Preliminary Report for Application No. PCT/US2015/053234 dated Apr. 4, 2017.

* cited by examiner

PORTABLE CHARGING CASE HAVING A HINGED LID

PRIORITY STATEMENT

This application is a non-provisional application that claims priority to U.S. provisional app. No. 62/058,399, filed on Oct. 1, 2014, the entire content of which is incorporated by reference in its entirety.

BACKGROUND

Field

Electronic vaping devices may include a power source that may be recharged.

Description of Related Art

Some electronic vaping devices include a power source, such as a rechargeable battery. The rechargeable battery may be recharged with a charger.

SUMMARY

At least one example embodiment relates to a portable charging case.

In at least one example embodiment, a portable charging case is configured to contain and charge an electronic vaping device or a battery thereof. The portable charging case includes a body, a cover hingedly connected to the body at a hinge axle, and a hinge assembly configured to pivot the cover portion relative to the body from a closed position to an open position. The hinge assembly includes a biasing component. The biasing component includes a pin and a spring. The pin includes a first end portion, a second end portion opposite the first end portion, and a spring stop. The spring is arranged about the first end portion. The first end portion extends through a surface of a housing such that the spring is compressed between the surface of the housing and the spring stop on the pin. The hinge assembly also includes a pin axle. The second end portion is pivotally attached to the cover at the pin axle. The pin axle is offset from the hinge axle.

In at least one example embodiment, the bottom of the pin is straight. The base of the top of the pin may be a spring stop. The top may be a curved top, and a base of the curved top may be the spring stop.

In at least one example embodiment, the spring is not compressed while the cover portion is in the closed position and/or the spring is compressed while the cover portion is in the open position. In at least one example embodiment, the spring is only compressed while the cover portion is between the closed position and the open position. The housing may be part of the cover portion.

In at least one example embodiment, the pin axle is movable between a first position below and horizontally offset to a first side of the hinge axle and a second position below and horizontally offset to an opposite side of the hinge axle.

In at least one example embodiment, the portable charging case is generally rectangular in shape with a height, a width and a depth. The portable charging case has a height ranging from about 80 mm to about 120 mm. The portable charging case has a width ranging from about 50 mm to about 60 mm and a depth ranging from about 10 mm to about 14 mm.

In at least one example embodiment, the portable charging case may further include a front indicator light configured to indicate a charging status of at least one of an electronic vaping device, a cartomizer, and a battery section. In at least one example embodiment, an insert subassembly and a top subassembly define a slot. The slot is configured to hold at least one of an electronic vaping device, a cartomizer, and a battery section when charging. The portable charging case may also include charging contacts disposed in the slot. The portable charging case may also include two opposing spring fingers configured to secure at least one of an electronic vaping device, a cartomizer, and a battery section within the slot. In some example embodiments, the portable charging case includes three slots.

In at least one example embodiment, the portable charging case may be die cast. The portable charging case may be formed of a material including at least one of metal and plastic.

In at least one example embodiment, the portable charging case may further include a USB port. The portable charging case may include a portable charging case battery and a battery indicator light configured to indicate status of the portable charging case battery. The portable charging case may include a power switch on a side of the body of the portable charging case. The power switch is electrically connected to the portable charging case battery. The power switch is configured to initiate a charging cycle.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
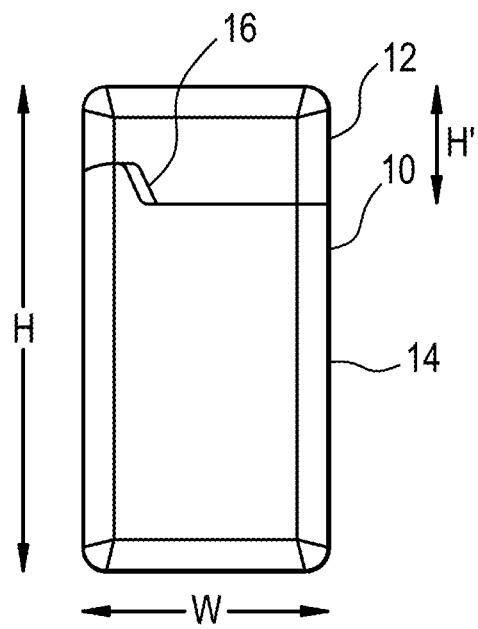
FIG. 1 is a front view of a portable charging case as described herein.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 3:
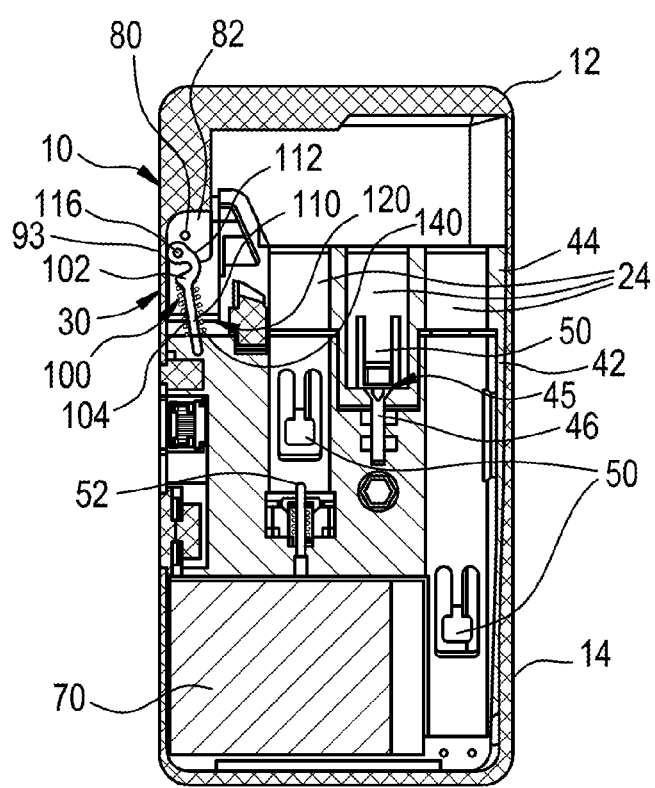
FIG. 3 is a front, cross-sectional view along line of the portable charging case shown in FIGS. 1 and 2.
Figure 4:
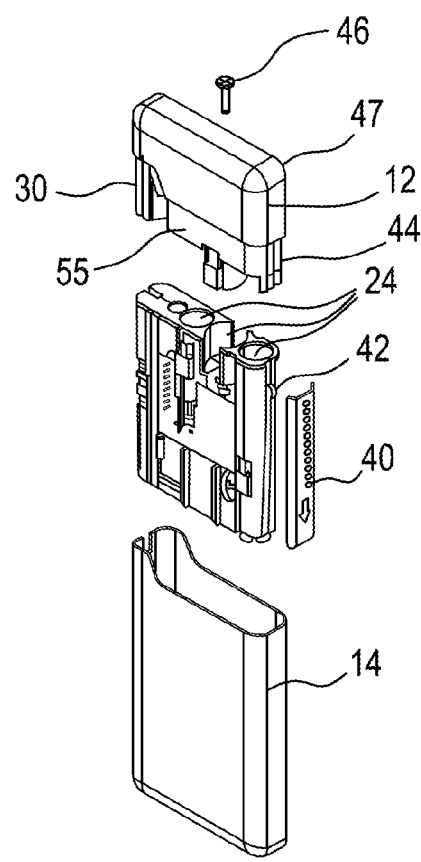
FIG. 4 is an exploded view of the portable charging case as described here.

As shown in FIG. 1, some example embodiments of a portable charging case 10 configured to charge one or more electronic vaping devices may include a body 14, a cover 12, and a hinge assembly 30 (shown in FIGS. 3 and 4). The hinge assembly 30 is configured to connect the cover 12 to the body 14. The portable charging case 10 may be generally rectangular in shape and may have generally curved and/or rounded corners that are pleasing to the touch. In some example embodiments, the portable charging case 10 may be formed in other shapes, such as squares or ovals, and may have beveled edges and/or sharp corners.

As used herein, the term "electronic vaping device" is inclusive of all types of electronic vaping devices that form a vapor, regardless of form, size or shape. A pre-vapor formulation is a material or combination of materials that may be transformed into a vapor. For example, the pre-vapor formulation may be a liquid, solid, and/or gel formulation including, but not limited to, water, beads, solvents, active ingredients, ethanol, plant extracts, natural or artificial flavors, and/or vapor formers such as glycerine and propylene glycol.

Moreover, the portable charging case 10 has a height (H) and a width (W). The height of the portable charging case 10 ranges from about 80 mm to about 120 mm, about 80 mm to about 140 mm, or about 100 mm. The width of the portable charging case 10 ranges from about 50 mm to about 60 mm, about 30 mm to about 60 mm, or about 51 mm. The height and width of the portable charging case 10 may be varied in order to accommodate varying numbers of batteries, electronic vaping devices and the like.

The cover 12 may have a varying height (H') across the width of the portable charging case 10. In addition, the portable charging case 10 may include a front indicator light (or display) 16, comprising one or more light emitting diodes (LEDs) that indicate the charging status of an electronic vaping device inserted therein. The LEDs may be any desired color, and the LEDs may be seen from both the front and back of the portable charging case 10, if desired. The display may include a liquid crystal display (LCD) or an E-ink display. The display may include an array of LEDs behind a screen of translucent plastic.

The cover 12 and the body 14 of the portable charging case 10 are formed of a material including one of plastic, metal, and combinations thereof. In some example embodiments, the body 14 and the cover 12 may be formed of stainless steel. The body 14 and the cover 12 may be die cast. The portable charging case 10 may be colored and/or may include indicia printed, embossed, etched, and/or engraved thereon.

Figure 2:
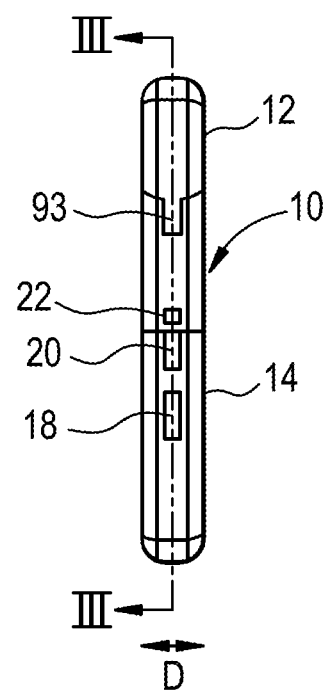
FIG. 2 is a side view of the portable charging case shown in FIG. 1.

As shown in FIG. 2, the portable charging case 10 also has a depth (D). The depth may range from about 10 mm to about 20 mm, about 10 mm to about 17 mm, or about 14 mm. The depth may vary based on the size of the electronic vaping devices used therein.

In some example embodiments, the portable charging case 10 may include a battery indicator light 22 that provides a charge status of the battery of the portable charging case 10, a USB port 20, and a power switch 18. The battery indicator light 22 may include one or more light emitting diodes that may illuminate in any desired color.

As shown in FIGS. 3 and 4, the portable charging case 10 may include a hinge assembly 30 that allows the cover 12 to rotate relative to the body 14 so as to open and close the cover 12.

In some example embodiments, the portable charging case 10 may include an insert subassembly 42, a top subassembly 44, an insert shim 40, and a screw 46 that holds the top subassembly 44 in place within the body 14 via the screw hole 45 (shown in FIG. 3) and in relation to the insert subassembly 42.

As shown, in some example embodiments, the portable charging case 10 may include three slots 24 extending through the insert subassembly 42 and the top subassembly 44. A first slot may be sized to hold a spare battery section of an electronic vaping device, a second slot may be sized to hold a spare cartomizer section of an electronic vaping device, and a third slot may be sized to hold a fully assembled electronic vaping device. Each slot includes two opposing spring fingers 50 that hold the respective electronic vaping device or component thereof in place when inserted in the portable charging case 10. The first slot includes electrical contacts 52 configured to form an electrical connection with the spare battery section. It is contemplated, in some example embodiments, that each slot 24 may hold a full electronic vaping device including external charging contacts, and that the electronic vaping device need not be disassembled for charging.

The portable charging case 10 is configured to charge a spare battery section (not shown) when the battery section is pushed down into one of the slots 24, such as the first slot nearest the hinge assembly 30. For this purpose, the portable charging case 10 includes a portable charging case battery 70 that is configured to charge the spare battery section two to three or more times before the portable charging case battery 70 must be recharged. In some example embodiments, a fully assembled electronic vaping device is not charged by the portable charging case 10 when inserted into the portable charging case 10. However, in some example embodiments, an electronic vaping device may include external charging contacts such that the electronic vaping device may be inserted into a charging slot 24, fully assembled, for charging.

As shown in FIGS. 3 and 4, the portable charging case includes the top subassembly 44. The top subassembly 44 has a bottom part 55 and a lid part 47. The cover 12 is part of the lid part 47. The bottom part 55 of the top subassembly 44 is secured to the insert subassembly 42 with, e.g., the screw 46, as discussed above. The lid part 47 is connected to the bottom part 55 via a hinge assembly 30. The lid part 47 is side-opening via the hinge assembly 30. In some example embodiments, the lid part 47 may open along the width similar to a hinged-lid cigarette package.

In some example embodiments, the hinge assembly 30 connects the lid part 47 with the bottom part 55 via a hinge axle (pin) 80. The hinge axle 80 is placed through a hinge element 82 that is fixedly attached to the cover 12. As the lid part 47 rotates around the hinge axle 80, the hinge element 82 rotates with the lid part 47. The hinge element 82 may be a separate piece or may be an integral part of the cover 12. In addition, the hinge assembly 30 includes a biasing component 100 which facilitates opening and closure of the cover 12 with a "cam-over" tactile response and which maintains the cover 12 in a fully closed condition when closed.

As shown in FIG. 3, the biasing component 100 includes a pin 102 and a spring 104. The pin (pawl) 102 is a single piece pin having a straight bottom (lower) portion 110 and a curved (arcuate) top portion 112. The base of the curved top portion 112 acts as a spring stop against which the spring 104 presses, for example during use of the hinge assembly 30 when the cover 12 is partly open. The spring 104 is arranged about a portion of the straight bottom portion (shank) 110. The bottom portion 110 of the pin 102 is a spring guide along which the spring 104 expands and contracts. In some example embodiments, the pin 102 may be formed from multiple pieces. In some example embodiments, the pin 102 may be formed in any manner that provides a spring stop thereon, such as formed with a bulge, larger diameter section, or other structure. In some example embodiments, the pin 102 may be substantially straight and the spring may press against the hinge element 82 or the cover 12.

The pin 102 is pivotally attached to the lid part 47 on the hinge element 82. The attachment of the pin 102 to the hinge element 82 may be made via a pin axle 116 extending through the curved top portion 112 of the pin 102. In the closed position shown in FIG. 3, the pin axle 116 is arranged on the hinge element 82 and to the lower left of the hinge axle 80, such that the pin axle 116 is below and horizontally offset to one side of the hinge axle 80.

The pin 102 may be detached from the bottom part 55, the pin extending and moving through a hole 140 in a bottom surface 120 of the bottom part 55. In some example embodiments, when the cover 12 is in a closed position, as shown in FIG. 3, the spring 104 is in a compressed state, pressing against the bottom surface 120 and against the spring stop (e.g., the base of the curved top portion 112). In this state of compression, the biasing component 100 biases the lid part 47 toward its closed position. The biasing is due to the force transmitted to the left of the hinge axle 80, causing the hinge element 82 to be biased in a clockwise (closing) direction.

In use, when opening the cover 12, the cover 12 rotates about the hinge axle 80, which causes the hinge element 82 to rotate. The rotation will cause the pin axle 116 to rotate under the hinge axle 80. This lowers the vertical position of the pin axle 116, and causes the pin 102 to be depressed through the hole 140 in the bottom surface 120 causing the spring 104 to compress or further compress. As the cover 12 opens further, the pin 102 pivots past a point of maximum depression, and the spring 104 exerts pressure against the pin stop (e.g., the base of the curved top portion 112 of the pin 102) causing the cover 12 to pop open. Throughout the motion, the pin axle 116 moves from its original position below and to one side of the pin axle 80 toward a second position below and to the other side of the pin axle 80. In some example embodiments, when the cover 12 is in an open position, the spring 104 is in a compressed state, pressing against the bottom surface 120 and against the spring stop (e.g., the base of the curved top portion 112). In this state of compression, the biasing component 100 biases the lid part 47 toward the opened position. This is due to the force transmitted to the right of the hinge axle 80, causing the hinge element 82 to be biased in a counter-clockwise (opening) direction. In some example embodiments, the hinge assembly 30 may also provide an audible and tactile indication that the cover 12 is opening and closing.

In some example embodiments, as shown in FIG. 3, with the cover 12 closed, the pin 102 is shown at a slightly left leaning angle relative to vertical (e.g., from about 3 degrees to about 30 degrees). With the cover 12 open, the pin 102 will be at a slightly right leaning angle relative to vertical (e.g., from about 3 degrees to about 30 degrees). In some example embodiments, the hole 140 is sized and positioned so that the pin 102 both slides and pivots relative to the hole 140 during opening and closing of the cover 12.

Figure 5:
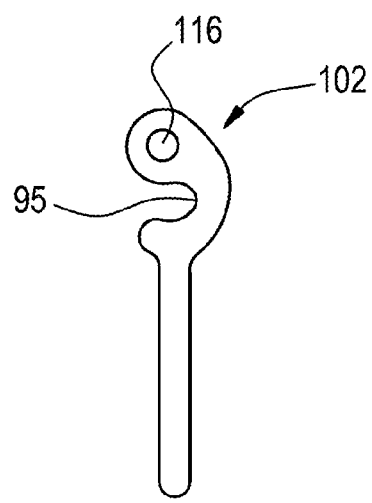
FIG. 5 is an enlarged view of a pin as described herein.

Referring now to FIGS. 2, 3, and 5, in some example embodiments, the cover 12 may include a downwardly extending finger portion 93. Upon rotation of the cover 12, the finger portion 93 pivots into the confines of the case whereupon the recess 95 of the pin 102 provides clearance between the pin 102 and the finger portion 93. In addition or instead, the recess 95 may be proportioned such that the recess 95 serves as a stop to further pivotal motion of the finger portion 93 and the cover 12.

It will now be apparent that a new, improved, and nonobvious portable charging case has been described in this specification with sufficient particularity as to be understood by one of ordinary skill in the art. Moreover, it will be apparent to those skilled in the art that numerous modifications, variations, substitutions, and equivalents exist for features of the portable charging case which do not materially depart from the spirit and scope of the invention. Accordingly, it is expressly intended that all such modifications, variations, substitutions, and equivalents which fall within the spirit and scope of the invention as defined by the appended claims shall be embraced by the appended claims.

We claim:

1. A portable charging case comprising:
   a body;
   a cover hingedly connected to the body at a hinge axle; and
   a hinge assembly configured to pivot the cover relative to the body from a closed position to an open position, the hinge assembly including,
      a biasing component comprising a pin and a spring, the pin including a first end portion, a second end portion opposite the first end portion, and a spring stop, the second end portion including a curved top portion having a recess therein, the spring arranged about the first end portion, the first end portion extending through a surface of a housing such that the spring is compressed between the surface of the housing and the spring stop on the pin, and
      a pin axle, the second end portion being pivotally attached to the cover at the pin axle, the pin axle being offset from the hinge axle.

2. The portable charging case of claim 1, wherein the pin axle is movable between a first position below and horizontally offset to a first side of the hinge axle and a second position below and horizontally offset to an opposite side of the hinge axle.

3. The portable charging case of claim 1, wherein the first end portion of the pin is straight.

4. The portable charging case of claim 1, wherein a base of the second end portion is the spring stop.

5. The portable charging case of claim 1, wherein a base of the curved top is the spring stop.

6. The portable charging case of claim 1, wherein the first end portion of the pin is straight, and a base of the curved top is the spring stop.

7. The portable charging case of claim 1, wherein the spring is at least partially compressed while the cover is in the closed position.

8. The portable charging case of claim 1, wherein the spring is at least partially compressed while the cover is in the open position.

9. The portable charging case of claim 1, wherein the spring is compressed while the cover is between the closed position and the open position.

10. The portable charging case of claim 1, wherein the portable charging case is generally rectangular in shape and has a height, a width and a depth.

11. The portable charging case of claim 10, wherein the portable charging case has a height ranging from about 80 mm to about 140 mm.

12. The portable charging case of claim 10, wherein the portable charging case has a width ranging from about 30 mm to about 60 mm.

13. The portable charging case of claim 10, wherein the portable charging case has a depth ranging from about 10 mm to about 17 mm.

14. The portable charging case of claim 1, further comprising:
    a front indicator display configured to indicate a charging status of at least one of an electronic vaping device, a cartomizer, and a battery section.

15. The portable charging case of claim 1, further comprising:
    an insert subassembly and a top subassembly defining a slot, the slot configured to hold at least one of an electronic vaping device, a cartomizer, and a battery section when charging.

16. The portable charging case of claim 15, further comprising:
    charging contacts disposed in the slot.

17. The portable charging case of claim 15, further comprising:
    two opposing spring fingers disposed in the slot, the spring fingers configured to secure at least one of an electronic vaping device, a cartomizer, and a battery section within the slot.

18. The portable charging case of claim 15, wherein the portable charging case includes three slots.

19. The portable charging case of claim 1, further comprising:
    a USB port.

20. The portable charging case of claim 1, further comprising:
    a portable charging case battery; and
    a battery indicator light configured to indicate status of the portable charging case battery.

21. The portable charging case of claim 20, further comprising:
    a power switch on a side of the body of the portable charging case, the power switch electrically connected to the portable charging case battery, the power switch configured to initiate a charging cycle.

22. The portable charging case of claim 1, wherein the portable charging case is die cast.

23. The portable charging case of claim 1, wherein the portable charging case is formed of a material including at least one of metal and plastic.

24. The portable charging case of claim 1, wherein the housing is part of the cover.

25. The portable charging case of claim 1, wherein the cover includes a finger portion.

26. The portable charging case of claim 25, wherein the recess faces the finger portion of the cover, and the finger portion is configured to pivot into the recess when the cover is opened.

\* \* \* \* \*